United States Patent [19]

Bauer et al.

[11] 4,384,959
[45] May 24, 1983

[54] WET OXIDATION PROCESS UTILIZING DILUTION OF OXYGEN

[75] Inventors: Gerald L. Bauer, Rothschild, Wis.; Gary S. Dahmes, Channelview, Tex.; Ajit K. Chowdhury, Schofield, Wis.

[73] Assignee: Sterling Drug Inc., New York, N.Y.

[21] Appl. No.: 220,529

[22] Filed: Dec. 29, 1980

[51] Int. Cl.³ .............................................. C02F 1/02
[52] U.S. Cl. ................................... 210/739; 210/761; 162/31; 162/49; 422/2; 422/3; 422/10
[58] Field of Search ................... 210/761, 762, 739; 436/55, 137; 422/2, 3, 10, 110, 111; 162/31, 49, 61, 62, 65

[56] References Cited

U.S. PATENT DOCUMENTS

| | | |
|---|---|---|
| 3,042,489 | 7/1962 | Schoeffel. |
| 3,097,988 | 7/1963 | Schoeffel .......................... 162/31 |
| 3,272,739 | 9/1966 | Earle et al. ....................... 210/761 |
| 3,654,070 | 4/1972 | Pradt et al. ....................... 162/65 |
| 4,013,560 | 3/1977 | Pradt ................................. 210/761 |
| 4,191,012 | 3/1980 | Stoddard et al. ................. 210/761 |

OTHER PUBLICATIONS

F. E. Littman & F. M. Church, Final Report: Reactions of Titanium with Water and Aqueous Solutions, Stanford Research Institute Project No. SD-2116, Jun. 15, 1958.

David L. Pippen, Jack Stradling and Gene W. Frye, Safety Considerations Regarding the Use of High Pressure Oxygen, NASA, White Sands Facility Johnson Space Center, Sep. 1979.

Primary Examiner—William F. Smith
Attorney, Agent, or Firm—Allen H. Erickson; Thomas L. Johnson; B. Woodrow Wyatt

[57] ABSTRACT

A continuous process for wet oxidation of aqueous liquor containing combustible matter using oxygen or oxygen enriched gas. An inert diluent gas is injected into the aqueous liquor or reactor off-gas such that oxygen in the gas phase is diluted by the sum of generated water vapor, produced carbon dioxide and injected inert gas to a concentration less than required for spontaneous combustion at every location in the system having surfaces not continually exposed to a continuous liquid water phase.

29 Claims, 2 Drawing Figures

WET OXIDATION PROCESS UTILIZING DILUTION OF OXYGEN

BACKGROUND OF THE INVENTION

1. Field of the Invention

This invention relates to safe operation of wet oxidation systems using pure oxygen or oxygen enriched gases.

2. Description of the Prior Art

Wet oxidation is a well-established process for treating aqueous wastewaters, sludges and slurries which contain oxidizable substances; more than one hundred wet oxidation units are in commercial operation. Many patents and other publications disclose wet oxidation processes using air as the source of oxygen for accomplishing the oxidation. Schoeffel U.S. Pat. Nos. 3,042,489 and 3,097,988, and Pradt et al. U.S. Pat. No. 3,654,070 disclose the application of pure oxygen or an oxygen enriched gas to wet oxidation processes. For this discussion, the term "oxygen", when used without a modifying adjective will refer to any gas containing greater than 21 mole percent oxygen, to distinguish it from air.

Increased reaction rates and the opportunity to operate at lower pressures and temperatures make the use of oxygen very attractive from a theoretical standpoint. In addition, many potential users of the wet oxidation process, such as sewage treatment plants, steel mills, etc. have existing oxygen generation/storage facilities, making the gas available at low cost.

To date however, no wet oxidation processes have been operated commercially using oxygen. One important reason is that no one has yet shown how oxygen can be safely used in wet oxidation processes under steady state and transient conditions common to such processes.

In wet oxidation systems, aqueous and gaseous phases coexist at elevated pressures and temperatures. System pressures are chosen so that there will always be an aqueous phase. Oxidation reactions consume oxygen and generate carbon dioxide. When the aqueous phase has a neutral or low pH, a major portion of the carbon dioxide formed by wet oxidation will remain in the gaseous phase, diluting the oxygen. When the aqueous phase is caustic, however, much of the carbon dioxide will be absorbed in the aqueous phase.

The quantity of water vapor which is present in the gas phase is a function of temperature, pressure, and quantity of non-condensible gases (NCG), and can be determined by known thermodynamic relationships. For a given system operating at a nearly uniform pressure, the degree of gas dilution by water vapor is much greater at the higher temperatures.

In prior art processes using air as the source of oxygen, the percentage of oxygen in the gas phase at elevated temperatures and pressures is considerably less than 21 percent, even without any oxygen consumption. For example, at 550° F. and 1000 psi pressure, water vapor dilutes the oxygen from its original 21 percent to a concentration of about 5 percent. As oxygen is consumed its concentration at reactor conditions drops to very low values. Therefore, pure oxygen or oxygen enriched gas can be used advantageously in enhancing the rate and completeness of oxidation, so long as the safety of the process can be ensured.

Gaseous oxygen, when diluted to a concentration of 21 mole percent as in the form of air, is safe to handle, even when compressed to quite high pressures.

However, oxygen at higher concentrations, especially high purity oxygen, is likely to undergo rapid, spontaneous combustion when placed in contact with organic or other oxidizable substances at pressures above atmospheric, even at room temperature. In the wet oxidation process, high concentrations of oxidizable materials are deliberately oxidized. It is vital to control the process so that transient excursions of temperature, pressure, and thermal efficiency are minimal and hazardous operating conditions do not occur.

Moreover, many metals such as steel, aluminum and titanium, for example, will burn vigorously in the presence of oxygen once an ignition has occured. Titanium itself has been shown to be capable of undergoing spontaneous combustion under certain conditions in the presence of oxygen and water at elevated pressures, as reported by F. E. Littman and F. M. Church in Final Report: Reactions of Titanium with Water and Aqueous Solutions, Stanford Research Institute Project No. SD-2116, June 15, 1958.

In the handling of oxygen, traditional safety practice has emphasized selection of materials of construction which will not themselves undergo spontaneous combustion at design operating conditions, and strict cleanliness standards to ensure that no contaminants capable of spontaneous combustion are present in the system. In wet oxidations, however, the choice of materials of construction is nearly always constrained by the corrosive properties of the wastewater, sludge, or slurry being oxidized. Thus titanium or titanium alloys may be dictated as the material of construction when severe corrosion of iron- or nickel-based alloys is indicated. Moreover, the wet oxidation system treats wastewaters, sludges, or slurries which may contain up to ten percent or even higher concentrations of organic substances, and its interior surfaces may always be contaminated with substances capable of spontaneous combustion upon contact with oxygen at high pressures.

Therefore, the use of wet oxidation employing pure oxygen or an oxygen enriched gas in a system fabricated of titatium, where the interior surfaces may always be contaminated with organic matter appears to be definitely precluded.

On the other hand, the use of oxygen in a wet oxidation installation may be very attractive. If oxygen is already available onsite, the capital and operating costs for a large air compressor are eliminated. Favorable oxidation kinetics will result in a smaller reactor and/or lower operating temperature and pressure. Other potential advantages of using oxygen may be evident to those familiar with wet oxidation.

The object of this invention, therefore is to make possible the use of pure oxygen or oxygen enriched gas in a wet oxidation process under conditions of safety comparable to traditional wet oxidation processes using air.

SUMMARY OF THE INVENTION

In this invention, a continuous process for wet oxidizing aqueous waste liquors containing combustible matter comprises the steps of:

a. continuously introducing aqueous waste liquor and oxygen or oxygen enriched gas into a pressurized reactor operated at elevated temperature;

b. oxidizing therein a major portion of the combustible matter in said aqueous waste liquor to produce an oxidized liquor and offgases;

c. passing oxidized liquor and offgases from said reactor through an effluent line to a heat exchanger where oxidized liquor and offgases are cooled;

d. reducing the pressure of cooled oxidized liquor and offgases in a pressure control valve operated to maintain the reactor at a substantially constant pressure.

e. separating the offgases from the oxidized liquor in a gas-liquid separator; and f. injecting an inert gas into said pressurized aqueous waste liquor at a rate such that oxygen in the gas phase is diluted by the sum of generated water vapor, produced carbon dioxide, and injected inert gas to a concentration less than required for spontaneous combustion at every location in the reactor, effluent line, pressure control valve, and separator, having surfaces not exposed to a continuous liquid water phase.

In another embodiment of the invention, steam or carbon dioxide are safely produced by wet oxidation of combustible matter with pure oxygen or oxygen enriched gas, comprising the steps of:

a. continuously introducing aqueous liquor and oxygen or oxygen enriched gas into a pressurized reactor operated at elevated temperature;

b. oxidizing therein a major portion of the combustible matter to evaporate substantially all of the water entering the reactor and introducing water to maintain a substantially constant liquid level in the reactor;

c. passing offgases, including water vapor from the reactor through a line to a pressure control valve whereby the reactor pressure is maintained at a substantially constant pressure;

d. passing offgases at reduced pressure to a using process;

and e. injecting an inert gas into said pressurized liquor at a rate such that oxygen in the gas phase is diluted by the sum of generated water vapor, produced carbon dioxide and injected inert gas to a concentration less than required for spontaneous combustion at every location in the reactor and lines therefrom including valves, having surfaces not exposed to a continuous liquid water phase.

DESCRIPTION OF THE PREFERRED EMBODIMENTS

Figure 1:
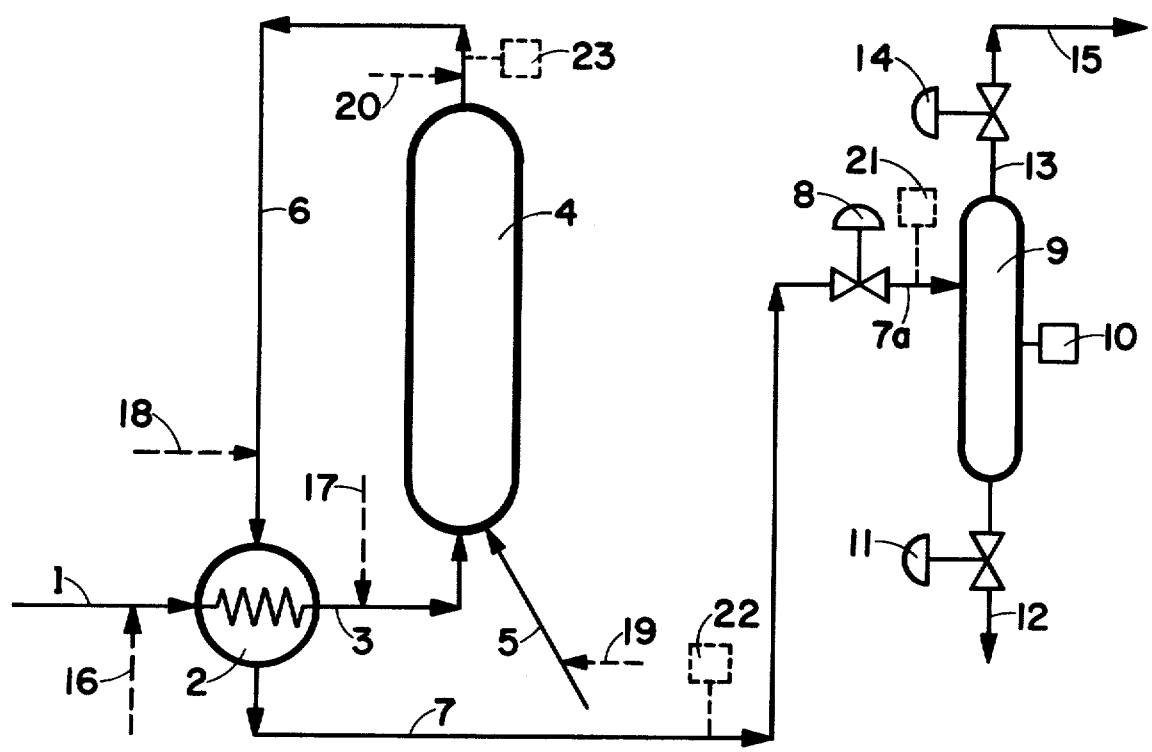
FIG. 1 is a flow diagram of a wet oxidation system showing several possible embodiments of this invention.

This invention comprises performing a wet oxidation using pure oxygen or an oxygen enriched gas under conditions such that at every location in the system where a gas phase containing oxygen comes into continuous contact with a solid surface which might be contaminated with a deposit of some oxidizable substance or which itself might undergo spontaneous combustion in the presence of oxygen, the oxygen in the gas phase at that location will be diluted to a concentration less than the concentration at which a spontaneous combustion can occur.

Normally, an oxygen concentration of 21 mole percent, the same as in air, is the highest concentration at which spontaneous combustion will not occur. Some materials will ignite only at oxygen concentrations considerably higher than 21 mole percent. On the other hand, some wastes which contain particularly sensitive substances may ignite at oxygen concentrations less than 21 mole percent. The ignition concentration can be determined by use of either the Pneumatic Impact Test or the Mechanical Impact Test, both of which are described in "Safety Considerations Regarding the Use of High Pressure Oxygen" by David L. Pippen, Jack Stradling and Gene W. Frye, NASA, White Sands Testing Facility, Johnson Space Center, September, 1979.

The inert gas which is injected will typically be nirogen, carbon dioxide, air (because of its nitrogen content) or steam, but other inert gases may be used.

The source of the inert diluent gas is a significant aspect of this invention. If air is to be used it is a simple matter to provide an air compressor for the wet oxidation system. If oxygen is supplied by an air separation plant located close to the wet oxidation system then nitrogen from the air separation plant, taken as either gaseous or liquid nitrogen could be used as the inert diluent gas.

Carbon dioxide may also be used as the inert gas.

Steam may be a useful "inert" gas particularly for injection into vapor spaces or pipes carrying primarily vapors. When the steam temperature is greater than the oxygen containing gas, a portion of the steam will condense, thus wetting the equipment walls. This condensate is available to absorb heat generated by spontaneous combustion of organic matter which may be deposited on the equipment walls.

Most often a combination of two or more of the above listed gases are present and dilute the oxygen. For example, in a wet oxidation process which utilizes pure oxygen to oxidize a waste water containing an organic pollutant, a small stream of compressed air is added to the system upstream of the reactor. In the reactor and in the reactor effluent, oxygen which has not yet reacted is diluted by a combination of water vapor evaporated from the wastewater, carbon dioxide generated by oxidation of the organic pollutants, and nitrogen from the injected air. Down stream from the heat exchanger where the water vapor is condensed, the oxygen is still diluted by the carbon dioxide and nitrogen. If the waste concentration drops suddenly, or if the waste flow into the system stops suddenly so that carbon dioxide is no longer generated, there is nevertheless sufficient nitrogen flowing downstream of the heat exchanger so that the oxygen still flowing in the line is diluted to a safe concentration.

The locations at which oxygen and any diluent gas are added to the wet oxidation system are important features of this invention. The oxygen is added either directly at the reactor bottom or is mixed with the waste after the waste is preheated but before it flows into the reactor. In the latter case, diluent gas is mixed with the waste either upstream, or at the same point at which oxygen is being mixed with the influent liquor which contains combustible materials. More specifically, the diluent gas is added at one or more of the following locations:

a. directly to the reactor if the oxygen is also being added directly to the reactor bottom;

b. to the preheated waste just upstream from the reactor;
c. to the raw waste before it is preheated in the heat exchangers; or
d. to the oxygen supply line upstream from the point at which oxygen is mixed with wastewater.

The location where the diluent gas is to be added to the wet oxidation system is selected so that the diluent gas will flow through, dilute out, or purge all locations in the wet oxidation plant where pure oxygen or an oxygen enriched gas may collect.

At some installations uncontrolled spontaneous combustion is most likely to occur in the line carrying cooled reactor offgases. Upon condensation of water vapor, the oxygen content in the offgases markedly increases and may attain a critical level if corrective action is not taken. Furthermore, mechanical shock caused by action of the pressure control valve, or shock caused by adiabatic compression upstream of the pressure control valve may result in ignition.

In cases where high oxygen concentration in the absence of a continuous liquid water phase may occur downstream of the reactor but not in the reactor itself, an inert gas may be injected downstream of the reactor, typically before the mixture of oxidized liquor and offgases is cooled.

The amount of inert diluent gas added to the wet oxidation process will vary depending on the wastewater being oxidized and on the conditions under which the system is being operated. For example, if the wet oxidation process is running at a reasonably steady state and is generating enough carbon dioxide to dilute the oxygen conained in the effluent gas stream to less than 21 mole percent, then the flow of the inert diluent gas can be stopped. On the other hand, if the wet oxidation process is experiencing some upset, is being shut down, or is about to be started up the flow of inert diluent gas should be turned on to prevent any pocket of high purity oxygen from developing in the reactor and downstream piping and to purge out any oxygen pockets that may have already developed.

The flow rate of the inert diluent gas is sized from a consideration of two criteria. First, the diluent gas flow must be sufficient so when the oxygen flow is turned down to the minimum allowed by the oxygen flow control system, the inert diluent gas flow rate is sufficient to dilute the oxygen still flowing into the system to 21 mole percent. Thus if the minimum repeatable oxygen flow is 10 percent of the design oxygen flow rate, then the diluting gas flow is at least 0.376 moles per mole of oxygen fed to the plant at the design flow rate. This is about one tenth the flow of air that would be supplied to a wet oxidation process using air as the oxygen source.

Secondly the design flow rate of inert diluent gas must be sufficient so that the oxygen in the effluent from the wet oxidation process will always be diluted to or below 21 percent even when no diluting gases such as carbon dioxide are produced during the wet oxidation process. Thus if the wet oxidation process is designed for 90 percent oxygen utilization the amount of inert diluent gas needed is 0.376 moles per mole of oxygen fed at the normal design flow rate. If the nitrogen content of air is used as the diluent then the air flow is 0.376/0.79 or 0.476 moles per mole of oxygen fed.

Normally the flow rate of inert diluent gas is between about 3.76 moles and 0.00376 moles per mole of oxygen fed to the unit at design flow rate. Preferably the flow of inert diluent gas is sized for between 0.376 and 0.0376 moles per mole of oxygen fed to the wet oxidation unit at the normal design flow rate.

FIG. 1 illustrates one embodiment of this invention. As shown in the figure, an aqueous waste liquor containing an organic pollutant is pressurized and enters the wet oxidation unit through feed line 1 and then passes to heat exchanger 2. The waste liquor is preheated by indirect heat exchange with hot oxidized liquor from reactor 4. The heated liquor then passes through line 3 to reactor 4, where it is mixed and reacted with pure oxygen or oxygen enriched gas entering reactor 4 through line 5. The organic pollutant in the aqueous waste liquor is oxidized at the elevated (300°-650° F.) temperatures in the reactor. The reactor pressure is controlled to maintain a liquid phase and is typically 200 to 3200 psig.

Oxidized liquor and offgases pass from the reactor via line 6 to heat exchanger 2, where they are cooled. Much of the water vapor in the offgases is condensed, and the cooled mixture of oxidized liquor and offgases passes through line 7 to pressure control valve 8 which maintains the elevated pressure in the reactor. The mixture passes at reduced pressure through line 7a to vapor-liquid separator 9 wherein oxidized liquors and offgases are separated. Control valves 11 and 14 regulate the flow of oxidized liquor and offgases, respectively, from separator 9.

A diluent inert gas such as nitrogen, carbon dioxide, air or steam is injected into the waste liquor to result in an oxygen concentration less than necessary for spontaneous combustion to occur wherever a continuous liquid phase may not exist and oxidizable matter may be present in the system. This gas may be injected prior to heat exchange, as through line 16, or following heat exchange, as through line 17. Alternatively, the diluent gas may be injected into the oxygen or oxygen enriched gas through line 19 or even directly into the reactor through a separator line, not shown. It is preferred to inject the inert gas either by itself or as a mixture with the waste liquor or oxygen, into the lower portion of the reactor. In any case, at every site in the system where equipment surfaces are not continuously exposed to a continuous liquid water phase, and where oxidizable matter, whether organic matter or the surface itself is present, the concentration of oxygen is maintained at a level where spontaneous combustion will not occur. Such sites may exist in reactor 4, effluent lines 6, 7, and 7a from the reactor (including heat exchanger), pressure control valve 8 and separator, including its discharge lines. All locations in the system downstream from the location where oxygen and liquor are mixed are potential combustion sites.

Combustion differs from wet oxidation in the context of this invention in that wet oxidation occurs in the liquid phase while combustion is a vapor phase oxidation.

Where the pH of the reactor aqueous phase is neutral or acidic, carbon dioxide generated by oxidation largely remains in the vapor phase and dilutes the oxygen. At any given pressure and temperature, the quantity of water vapor in the gas phase is proportional to the quantity of nominally non-condensible gases present. Hence the quantity of injected inert gas required in the reactor at steady state operation may be very small, or even none. However, downstream of heat exchanger 2, in line 7 for instance, most of the water vapor has condensed, and additional diluent gas may be required to prevent spontaneous combustion. In such cases the inert gas may be injected into line 6 through line 18 in order to maintain safe oxygen concentrations in heat exchanger 2 and equipment downstream therefrom.

Many methods for controlling the process can be envisioned. For example, the flow rate of pure oxygen or oxygen enriched gas may be controlled by measurement of oxygen concentration in the gas phase (offgases) by analyzer represented in FIG. 1 as 21, 22, or 23, while the flow rate of inert gas is maintained constant. Analyses of the offgas anywhere in the system may be used, provided proper corrections for differences in temperature and pressures are made.

Referring again to FIG. 1, suppose that the wet oxidation system operated at neutral or acid pH is designed for 95 percent utilization of the pure oxygen fed to the system, and that the range in flow control through line 5 is a ratio of 20:1.

During normal steady state operation at design conditions the carbon dioxide produced in the oxidation reactions is more than enough to dilute the offgas oxygen to less than 21 mole percent. Accordingly, the flow of diluent gas is shut off during steady state operation. However, during the start up and shut down, and also during a period of process upset the carbon dioxide produced may not be enough to dilute the oxygen to less than 21 mole percent so according to the criteria described previously an inert diluting gas flow of 0.188 mole per mole of oxygen at design flow is required to ensure the safety of the process. If air is used as the inert diluent gas the flow of air must be 0.188/0.79=0.238 mole per mole of oxygen since only the nitrogen component of air functions as the inert gas. The oxygen in air would be largely consumed in the wet oxidation.

In another control method, where air is used as the diluent, the flow rate of oxygen or oxygen enriched gas is constant, while the air rate is varied in accordance with the measured oxygen concentration in the offgases. In this embodiment, air may supply a significant portion of the oxygen consumed in the process.

The wet oxidation of FIG. 1 is now used to treat a highly alkaline waste water containing organic pollutants. The waste is sufficiently alkaline so that all carbon dioxide produced in the reactor is dissolved in the wastewater as carbonate and is not available for diluting oxygen. Now in the reactor 4 and in line 6 oxygen in the vapor phase is diluted only by steam and the inert diluent gas. At the effluent end of the heat exchanger 2 and in line 7 the steam has been condensed from the vapor phase so oxygen is diluted only by the inert diluent gas added to the process. Since there is never any produced carbon dioxide present in the effluent gas phase the flow of inert diluent gas must remain on as long as the wet oxidation system is running.

Again, since the wet oxidation system is designed for 95 percent utilization of oxygen fed to the unit, and since the range of the flow controller controlling the flow of oxygen flow through line 5 is 20 to 1, the flow of inert diluent gas should be at least 0.188 moles per mole of oxygen fed.

The flow rate of the inert gas will range from 3.76 to 0.00376 moles per mole of oxygen introduced into the reactor, depending upon waste COD and pH, reactor temperature and pressure, material of equipment construction, and the particular inert gas which is used. In nearly all cases, the inert gas flow is between 0.376 and 0.0376 moles per mole of oxygen introduced.

Figure 2:
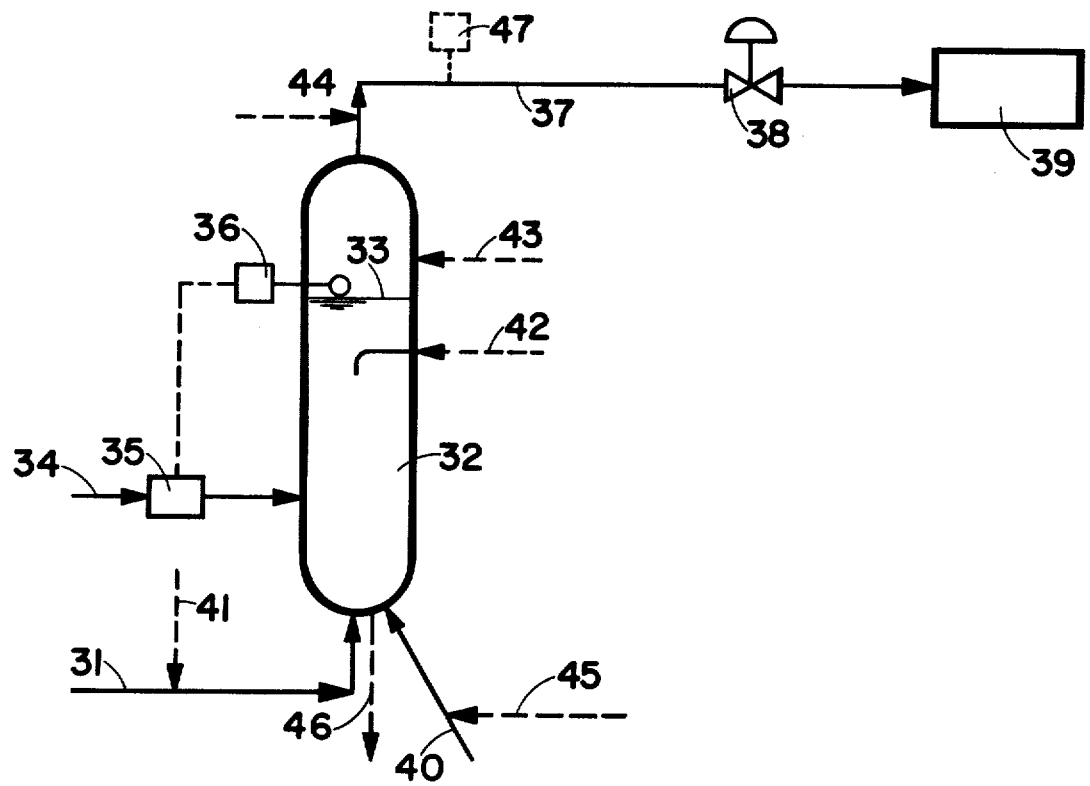
FIG. 2 shows a further embodiment of the invention for generating steam and/or carbon dioxide by wet oxidation.

Turning now to FIG. 2, we have another embodiment of this invention, in which pure oxygen or oxygen enriched gas is used in the wet oxidation of aqueous liquors containing oxidizable matter. In this embodiment, substantially all of the water introduced leaves the reactor as water vapor. In FIG. 2, a liquor is pumped through line 31 into reactor 32 where it is mixed with and undergoes reaction with oxygen or oxygen enriched gas introduced through line 40. A liquid level 33 is maintained by controlling the flow of water through line 34 by level controller 36. Offgases, including water vapor leave the reactor through line 37 and pressure control valve 38 to a using process 39, for example, a power generation plant.

When necessary, the small quantity of ash which may accumulate in the reactor is discharged as a small stream through line 46.

The oxygen flow may be controlled by measurement of oxygen concentration in the offgas by analyzer 47. If the rate of oxidizable matter introduced into the reactor is precisely known, of course, the oxygen flow rate may be controlled without continuous measurement of offgas oxygen.

Normally the preferred point of introducing the inert gas is into the aqueous liquor through line 41 or into the oxygen through line 45. Alternate locations may be through line 42 or 43 directly into the reactor. Introduction into the liquid phase through line 42 ensures dilution at the liquid-vapor interface on the reactor walls.

If the critical site for possible spontaneous combustion lies downstream of reactor 32, for example downstream of valve 38, inert gas may be introduced through line 44 into vapor line 37. In this case, the use of steam as the dilutent may be used.

EXAMPLE 1

A spent caustic scrubbing liquor was treated by wet oxidation in a pilot plant having the flow configuration of FIG. 1. The reactor was operated at a temperature of 412° F. and a pressure of 335 psig, with a liquid residence time of 30 minutes. Inert gas (air) was added at the reactor top through line 20 to line 6 leaving reactor 4 at a rate sufficient to dilute the residual oxygen to a safe level. All of the $CO^2$ generated by oxidation was absorbed into the liquid phase. Without dilution, the cooled offgas after separation would have been essentially pure oxygen. Air was injected at a rate of 1.01 mole per mole of original oxygen introduced, resulting in an oxygen concentration of 27 percent in the cooled offgases.

EXAMPLE 2

A liquor containing waste solvents, with pH of 13.1, was wet oxidized in a pilot plant with the configuration of FIG. 1. The reactor conditions were 600° F. and 1950 psig pressure, with a liquid residence time of 120 minutes. In this case air was added as the inert gas to the liquor through line 16 prior to preheating in order to prevent possible polymerization of liquor components in the heat exchanger. Pure oxygen was added to the reactor through line 5.

The ratio of air injected to oxygen was 0.430 moles air/mole oxygen, resulting in an oxygen concentration of 19.87 mole percent in the cooled offgases. The calculated oxygen concentration at the reactor top was 3.0 mole percent, and safe operation was achieved.

We claim:

1. A continuous process for wet oxidation of aqueous waste liquors containing combustible matter, comprising the steps of:

a. continuously introducing aqueous waste liquor and oxygen or oxygen enriched gas into a pressurized reactor operated at elevated temperature;

b. oxidizing therein a major portion of the combustible matter in said aqueous waste liquor to produce an oxidized liquor and offgases;

c. passing oxidized liquor and offgases from said reactor through an effluent line to a heat exchanger where oxidized liquor and offgases are cooled;

d. reducing the pressure of cooled oxidized liquor and offgases in a pressure control valve operated to maintain the reactor at a substantially constant pressure;

e. separating the offgases from the oxidized liquor in a gas-liquid separator; and f. injecting an inert gas into the pressurized aqueous waste liquor at a rate such that oxygen in the gas phase is diluted by the sum of generated water vapor, produced carbon dioxide and injected inert gas to a concentration less than required for spontaneous combustion at every location in the reactor, effluent line, pressure control valve and separator, having surfaces not continously exposed to a continuous liquid water phase.

2. The process according to claim 1, wherein said inert gas is nitrogen, carbon dioxide, steam or air.

3. The process according to claim 1, wherein the inert gas is injected into the lower portion of the reactor.

4. The process according to claim 1, wherein the inert gas is injected into said oxygen or oxygen enriched gas passing to said reactor.

5. The process according to claim 1, wherein the inert gas is injected into the aqueous waste liquor and the resulting mixture introduced into said reactor.

6. The process according to claim 5, wherein said resulting mixture is preheated in a heat exchanger prior to introduction into the reactor.

7. The process according to claim 1, wherein inert gas is injected at a constant rate, and the rate of oxygen or oxygen enriched gas to said reactor is controlled by measurement of oxygen concentration in the offgases.

8. The process according to claim 1, wherein oxygen or oxygen enriched gas is introduced into said reactor at a constant rate, and air is injected as the inert gas at a rate controlled by measurement of oxygen concentration in the offgases, such that a portion of the oxygen in the air is consumed in the reactor.

9. The process according to claim 1, wherein said reactor is operated at a temperature of 300° to 650° F. and at a pressure of 200 to 3200 psig.

10. The process according to claim 1, in which the oxygen concentration in said gas phase is diluted to 21 mole percent or less.

11. The process according to claim 1, wherein the required oxygen concentration in the gas phase to avoid spontaneous combustion is determined by the pneumatic impact test or mechanical impact test.

12. The process of claim 1, wherein said reactor interior walls and process lines are constructed of titanium or titanium alloy, and wherein the rate of inert gas injected is further constrained to dilute oxygen present in the gas phase in contact with said titanium or titanium alloy to a concentration at which ignition of said titanium or titanium alloy is obviated.

13. The process of claim 1, wherein the flow rate of inert gas is between 3.76 and 0.00376 moles per mole of oxygen introduced into the reactor.

14. The process of claim 1, wherein the flow rate of inert gas is between 0.376 and 0.0376 moles per mole of oxygen introduced into the reactor.

15. The process of claim 1, wherein said inert gas is injected only during non-steady state operation occurring at process start-up, shutdown and transient upsets in temperature, pressure or oxygen requirement.

16. A continuous process for wet oxidation of aqueous liquors containing oxidizable matter, comprising the steps of:

a. continuously introducing aqueous liquor and oxygen or oxygen enriched gas into a pressurized reactor operated at elevated temperature;

b. oxidizing therein a major portion of the oxidizable matter to evaporate substantially all of the water entering the reactor and introducing water to maintain a substantially constant liquid level in the reactor;

c. passing offgases, including water vapor from the reactor through a line to a pressure control valve whereby the reactor pressure is maintained at a substantially constant pressure;

d. passing offgases at reduced pressure to a using process; and e. injecting an inert gas into said pressurized liquor at a rate such that oxygen in the gas phase is diluted by the sum of generated water vapor, produced carbon dioxide and injected inert gas to a concentration less than required for spontaneous combustion, at every location in the reactor, and lines therefrom including valves, having surfaces not exposed to a continuous liquid water phase.

17. The process according to claim 16, wherein said inert gas is nitrogen, carbon dioxide, air, or steam.

18. The process according to claim 16, wherein the inert gas is injected into the lower portion of the reactor.

19. The process according to claim 16, wherein the inert gas is injected into said oxygen or oxygen enriched gas passing to said reactor.

20. The process according to claim 16, wherein the inert gas is injected into the aqueous liquor and the resulting mixture introduced into said reactor.

21. The process according to claim 16, wherein inert gas is injected at a constant rate, and the rate of oxygen or oxygen enriched gas to said reactor is controlled by measurement of oxygen concentration in the offgases.

22. The process according to claim 16, wherein oxygen or oxygen enriched gas is introduced into said reactor at a constant rate, and air is injected as the inert gas at a rate controlled by measurement of oxygen concentration in the offgases, such that a portion of the oxygen in the air is consumed in the reactor.

23. The process according to claim 16, wherein said reactor is operated at a temperature of 300° to 650° F. and at a pressure of 200 to 3200 psig.

24. The process according to claim 16, in which the oxygen concentration in said gas phase is diluted to 21 mole percent or less.

25. The process according to claim 16, wherein the required oxygen concentration in the gas phase to avoid spontaneous combustion is determined by the pneumatic impact test or mechanical impact test.

26. The process of claim 16, wherein said reactor interior walls and process lines are constructed of titanium or titanium alloy, and wherein the rate of inert gas injected is further constrained to dilute oxygen present in the gas phase in contact with said titanium or titanium alloy to a concentration at which ignition of said titanium or titanium alloy is obviated.

27. The process of claim 16, wherein the flow rate of inert gas is between 3.76 and 0.00376 moles per mole of oxygen introduced into the reactor.

28. The process of claim 16, wherein the flow rate of inert gas is between 0.376 and 0.0376 moles per mole of oxygen introduced into the reactor.

29. The process of claim 16, wherein said inert gas is injected only during non-steady state operation occurring at process start-up, shutdown and transient upsets in temperature, pressure of oxygen requirement.

* * * * *